United States Patent [19]

Kozlowski et al.

[11] Patent Number: 5,214,790
[45] Date of Patent: May 25, 1993

[54] ENHANCED TALKGROUP SCAN ALGORITHM

[75] Inventors: Thaddeus A. Kozlowski, Chicago; Daniel J. McDonald, Hanover Park; Guy G. Romano, Melrose Park, all of Ill.

[73] Assignee: Motorola, Inc., Schaumburg, Ill.

[21] Appl. No.: 667,696

[22] Filed: Mar. 11, 1991

[51] Int. Cl.$^5$ ............................................. H04Q 3/00
[52] U.S. Cl. .................................. 455/34.1; 455/34.2; 455/35.1; 455/54.2; 455/160.1; 455/166.2; 455/186.1; 455/218
[58] Field of Search ...................... 455/34.1, 34.2, 11.1, 455/35.1, 89, 160.1, 166.2, 186.1, 218, 54.1, 38.1, 67.1, 54.2

[56] References Cited

U.S. PATENT DOCUMENTS

| | | |
|---|---|---|
| 4,461,036 | 7/1984 | Williamson et al. ............. 455/160.1 |
| 4,553,262 | 11/1985 | Coe .................................. 455/54.2 |
| 4,618,998 | 10/1986 | Kawamura ......................... 455/34.1 |
| 4,672,657 | 6/1987 | Dershowitz ........................ 455/34.1 |
| 4,716,407 | 12/1987 | Borras et al. ....................... 455/32.1 |
| 4,837,858 | 6/1989 | Ablay et al. ........................ 455/34.1 |
| 5,133,082 | 7/1992 | White ................................. 455/67.1 |

Primary Examiner—Reinhard J. Eisenzopf
Assistant Examiner—Timothy H. Keough
Attorney, Agent, or Firm—Wayne J. Egan

[57] ABSTRACT

An enhanced talkgroup scanning algorithm is provided. This algorithm provides an efficient scan function when a unit scan list contains a mixture of trunked talkgroups and conventional channels. This is accomplished by adding a new scanning algorithm for conventional priority groups, and by enhancing the trunking talk group scanning cycle. A novel scanning algorithm for conventional priority groups is used to decrease the audio holes in trunking calls when looking back at a priority conventional channel. When a unit is active on a low priority trunking call and goes over to the priority conventional channel to check for activity, several new steps are taken into consideration when the unit goes back to the trunked system/active trunked call. Based on whether there has been activity on the priority channel, the unit will immediately return to the old voice channel (unsquelched) or revert to the control channel. A novel scanning algorithm for talk groups allows a unit to revert to scanning the conventional groups in the list quicker if there is no activity on the trunked system for any of the trunking groups in the list.

18 Claims, 3 Drawing Sheets

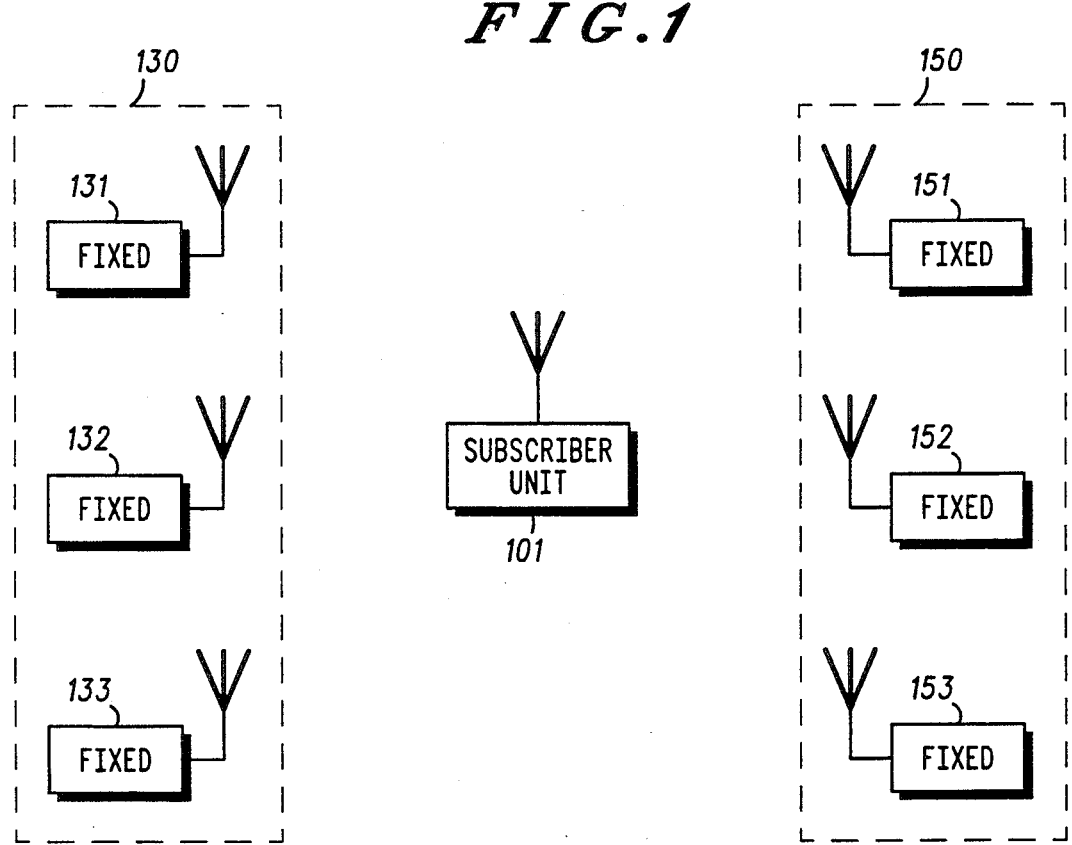

ENHANCED TALKGROUP SCAN ALGORITHM

TECHNICAL FIELD

This application relates to scanning algorithms for conventional and trunked radios.

BACKGROUND OF THE INVENTION

Currently there exist conventional radio systems and trunking radio systems. Each system offers its users the ability to scan their talk groups.

In a typical conventional system, a communication unit scans between different frequencies in order to listen to the various group activity in the unit's scan list, an internally stored list of talkgroup/conventional frequencies. In addition, groups are assigned higher levels of receive priority by the scanning radio. During non-priority calls, the unit will check the higher priority channel frequencies for call activity at predetermined intervals, thereby causing small audio holes such as, for instance, 50 msec in length every 500 msec.

In a typical trunking system, a communication unit locks onto a control channel, and thus monitors the call assignments for a match to its list of groups to be scanned. If a match occurs, the unit will follow the instructions in that call assignment and go listen to the traffic on the trunked channels. In addition, groups to be scanned are assigned multiple levels of receive priority by the scanning radio. This, along with a priority monitor algorithm, allows the scanning unit to hear higher priority traffic. While listening to a lower priority call, the communication unit will be decoding special voice channel signalling from the trunked resource controller looking for an announcement that a higher priority group has subsequently started a call on another channel. If this new group is in the unit's scan list and is in a higher priority, it will leave the voice channel of the current call in favor of returning to the control channel. Once there, it will determine the actual assigned voice channel of the higher priority call and go over as a receiver. This priority monitor function is described in Jaime Andres Borras et al., "Trunked Communication System True Priority Channel Scan," U.S. Pat. No. 4,716,407, issued Dec. 29, 1987, which patent is hereby incorporated herein by reference.

With the growing demand for wide-area/state-wide systems there is a desire to have the ability to monitor various trunking talkgroups and conventional channel freqencies used by other agencies in a single radio personality. In such an arrangement, the scanning unit needs to access multiple systems in order to monitor all call activity of interest. In such a situation, it is important to minimize time delays. For example, with the scanning radio initially engaged in a call on a trunked channel, the radio must leave the trunked system, scan the conventional system, and return to the trunked system—all with minimum time delay.

As a result, there is a need for an improved scanning algorithm.

SUMMARY OF THE INVENTION

According to the invention, an enhanced talkgroup scanning algorithm is provided. This algorithm provides an efficient scan function when a unit scan list contains a mixture of trunked talkgroups and conventional channels. This is accomplished by adding a new scanning algorithm for conventional priority groups, and by enhancing the trunking talk group scanning cycle.

According to the invention, a novel scanning algorithm for conventional priority groups is used to decrease the audio holes in trunking calls when looking back for activity on a priority conventional channel. When a unit is active on a low priority trunking call and goes over to the priority conventional channel to check for activity, several new steps are taken into consideration when the unit goes back to the trunked system/active trunked call. Based on whether there has been activity on the priority conventional channel, the unit will immediately return to the old voice channel (unsquelched) or revert to the control channel.

Moreover, the enhanced talkgroup scan algorithm, according to the invention, provides the user the ability to monitor calls on both conventional and trunking systems without experiencing long audio holes or reduced scanning efficiency. Thus, when the radio leaves a trunked call to scan the conventional system, the radio saves the identity of the trunked call before accessing the conventional system. After scanning the conventional system, the radio returns to the saved trunked call, instead of returning to the trunking system control channel, as in the prior art. This not only decreases response time, but also reduces the probability that the user will experience annoying audio holes.

Further according to the invention, a novel scanning algorithm for talk groups allows a unit to revert to scanning the conventional groups in the list quicker if there is no activity on the trunked system for any of the trunking groups in the list.

BRIEF DESCRIPTION OF THE DRAWINGS

FIG. 1 is a block diagram that shows a communication unit 101 arranged for scanning a conventional system 130 and a trunked system 150 using a scanning algorithm in accordance with the invention.

DETAILED DESCRIPTION OF THE INVENTION

Figure 2A:
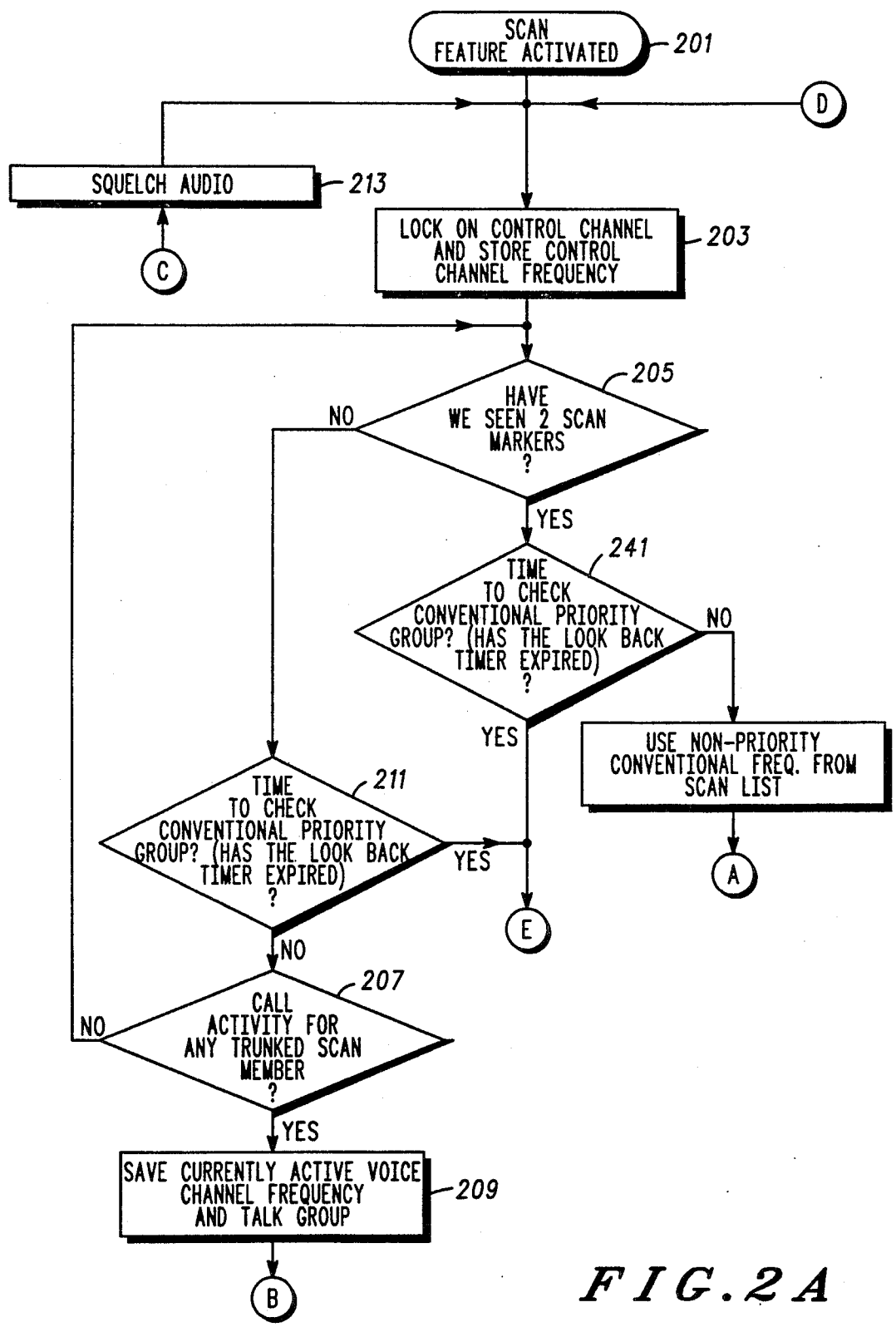
FIGS. 2A-2B is a flow diagram showing a first embodiment of an enhanced talkgroup scanning algorithm, according to the invention.

Referring now to FIG. 1, there is shown a communication unit 101 arranged to communicate with both a conventional system 130 and a trunking system 150. While operating in the conventional mode with system 130, the unit 101 scans between the different frequencies 131, 132, and 133. While operating in the trunking mode with system 150, the unit 101 monitors a control channel 151 in order to receive call assignments. The trunked system 150 includes a first trunked channel 152 and a second trunked channel 153.

It will be appreciated that the communication unit 101 operates in two modes, namely, a first conventional mode while scanning the conventional system 130, and a second trunking mode while scanning the trunking system 150. The invention provides an efficient scanning function by adding a new scan algorithm for scanning conventional priority groups in system 130, and by enhancing the trunking talk group scanning cycle for scanning system 150. The new scan algorithm for scanning conventional priority groups in system 130 is used to decrease the audio holes in trunking calls in system 150 when the unit 101 attempts to monitor at a priority conventional channel in system 130. The new scanning algorithm allows a unit to revert to scanning the conventional groups in its scan list, an internally stored list of talkgroup/conventional frequencies, for the conventional system (system 130) quicker if there is no activity on the trunked system (system 150) for any of the trunking groups in the list.

According to the invention, a unit operating in the trunked mode in system 150 and receiving a low priority talkgroup call has its conventional priority "look back" timer expire. The look back timer is a basic count down timer implemented in software in the communication unit. The timer is started when the communication unit initializes it with a predetermined value. Once the timer is initialized it will decrement its value every tick until it expires. The timer is said to have expired when its value is zero. A tick is a multiple of 1/(clock frequency). Therefore, if the clock frequency is 1 MHz or 1,000,000 HZ, a tick will occur in multiples of 1 us (or 1/1,000,000 seconds). For example, if a tick occurs every 10 us and the look back timer is initialized to 10 then it will take (10×10)/1,000,000 seconds (or 0.1 ms) to expire. A valid range of initial values would cause the look back timer to expire between 500 ms and 1 second. Each time the timer is decremented, it is checked by the communication unit to see if it has expired. If it has expired then a specific action is taken. In this case the look back timer is used by the communication unit to determine when it should monitor a priority conventional frequency for activity. The radio 101 will then store away the talkgroup and voice channel in system 150 that it is currently listening to. It will then revert to the priority channel in system 130 and determine if there is any carrier present. If there is no carrier present, the communication unit 101 will immediately return to the talkgroup call in system 150, which it had previously stored, and unsquelch on that voice channel. If the talkgroup call in system 150 had ended before the radio returned back to the voice channel, the communication unit will squelch after determining that there was no valid low speed data (subaudible data generated by the trunked system infrastructure) and return to the control channel.

If the unit detected carrier but not the proper code, then it will return to the active voice channel on the trunked system as mentioned above. The proper code is a series of tones or digital data generated by the base station which enable the radio to determine if it should unsquelch and join a call.

If the unit detected RF carrier and its proper code, it will remain on the priority channel until the call has ended. Once the call has ended, the unit will return to the trunking frequency that was the active control channel, and begin decoding trunking signalling data.

The talk group list scanning algorithm allows the unit to revert to scanning the conventional groups in system 130 in its scan list quicker if there is no activity on the trunked system (system 150) for any of the trunking groups in the list. This algorithm is a beginning/end scan marker to specify all active channel grants. Once a unit has decoded the trunking system scan marker outbound signalling words twice, it knows that it has seen all the active calls on the system and that it can go scan other systems. The scan marker outbound signalling words are outbound data from the trunked systems control channel which mark the start of voice channel activity for the trunked system. In other words they mark the beginning of a list of currently active calls on the trunked system.

In the case of scanning a mixture of multiple trunking and conventional groups, the communication unit will wait for two scan markers and then go check the conventional channels for activity. If there is no activity on the conventional channels, the radio will immediately return to the current control channel and restart the scan sequence.

Figure 2B:
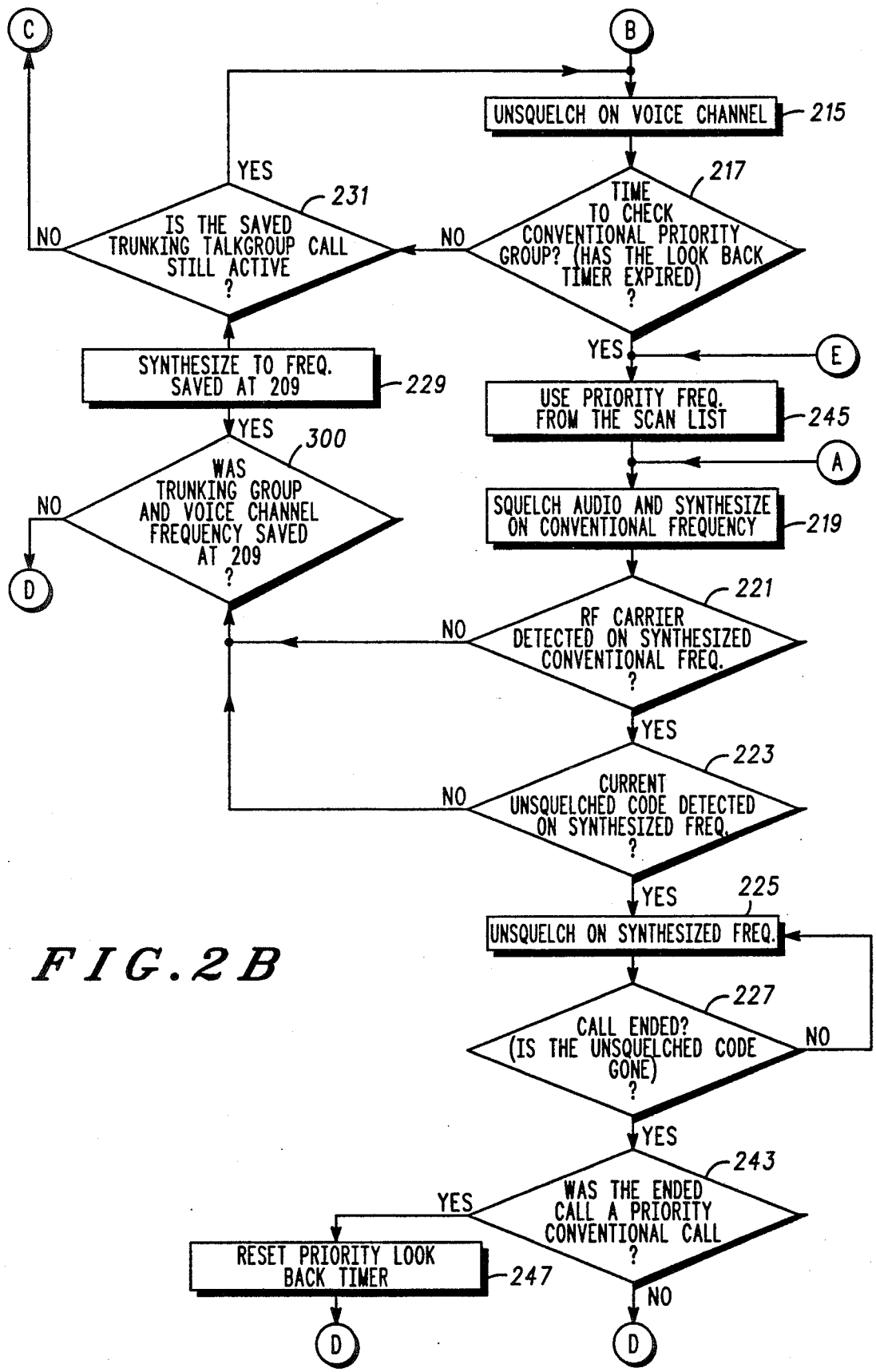

Referring now to FIG. 2A-2B, there is a flow diagram for a first embodiment of the invention. The communication unit 101 begins the scanning algorithm by activating the scan feature, step 201. The process next goes to step 203, where it locks onto the control channel 151 and stores the control channel frequency.

The process next determines whether it has seen two (2) scan markers, step 205. If the determination is negative the process goes to step 211. If the determination is affirmative, then the look back timer is checked, step 241. If the look back timer has expired then the process continues to step 245 via reference E, but if the look back timer has not expired then the communication unit will concentrate on a non-priority conventional frequency from its scan list and continue to step 219 (via reference letter A).

In step 211, the process determines whether it is time to scan the conventional priority group of system 130. The process determines this by checking to see if the look back timer has expired. If the determination is affirmative (the look back timer has expired), the process goes to step 245, via reference letter E. If the determination is negative (the look back timer has not expired), the process goes to step 207.

In step 207, the process determines whether there is call activity for any member of the trunking scan list. If the determination is affirmative, the process goes to step 209. Otherwise, if the determination is negative, the process returns to step 205.

Returning now to step 207, if the determination is affirmative, the process goes to step 209, where it saves the current voice channel frequency and talk group. The process next goes to step 215 (via reference letter B), where it unsquelches and receives audio on the voice channel.

The process next determines whether it is time to scan the conventional priority group in system 130, step 217, by determining wheter the look back timer has expired. If the determination here is negative, then the process goes to step 231. Otherwise, if the determination from step 217 is affirmative, the the communication unit chose its priority conventional frequency from its scan list and proceeds to step 219. In step 219 it unsquelches, receives audio, and synthesizes to the priority conventional channel frequency.

The process next goes to step 221, where it determines whether carrier has been detected.

If the determination from step 221 is negative, then the process goes to step 300. Otherwise, if the determination from step 221 is affirmative, the process goes to step 223, where it determines whether the proper code has been detected.

If the determination from step 223 is affirmative, the process unsquelches on the current channel, step 225, and then determines whether the call on the current channel has terminated, step 227. It is determined that the call is terminated when the unsquelch code is no longer being transmitted on the current channel. If the determination here is negative, the radio remains unsquelch (step 225), until the call terminates. After step 227 determines that the call has ended (determination is affirmative), the process checks the type of call that just ended, step 243. If it was a priority call then the look back timer is reset and the process returns to step 203 (via reference letter D). If the ended call was not a priority call then the process returns to step 203 (via reference letter D).

Returning now to step 223, if the process determines that the proper code has not been detected (determination is negative), the process checks to see if the old voice channel frequency was saved at step 209 (step 300). If it was not saved then the process continues to step 203 (via reference letter D). If it was saved then it goes to step 229, where it synthesizes the old voice channel frequency, unsquelches, and receives audio.

The process next goes to step 231, where it determines whether low speed data is still present on the voice channel. If the determination here is affirmative (low speed data present), the process returns to step 215. Otherwise, if the determination here is negative (low speed data not present), then the process goes to step 213 (via reference letter C), where it squelches the audio. The process then returns to step 203.

The enhanced talkgroup scan algorithm, according to the invention, allows units to effectively scan trunked and conventional groups in a single scan list. Current designs of subscriber radios do not support trunking/conventional group scan, with priority. Thus, with present systems, a user only has the ability to monitor trunked talk groups in the trunking mode or conventional groups in the conventional mode.

This invention provides the user the ability to monitor calls on both conventional and trunking systems without experiencing long audio holes or reduced scanning efficiency. Thus, when the radio leaves a trunked call to scan the conventional system, the radio saves the identity of the trunked call before accessing the conventional system. After scanning the conventional system, the radio returns to the saved trunked call, instead of returning to the trunking system control channel, as in the prior art.

Moreover, the present invention not only combines conventional scanning and trunking scanning but also provides a scan algorithm for conventional priority groups. Thus, when a unit is active on a low priority trunking call and goes over to the priority conventional channel to check for activity, several new steps are taken into consideration when the unit goes back to the trunked system/active trunked call. Thus, based on whether there has been activity on the priority channel, the unit will immediately return to the old voice channel (unsquelch) or revert to the control channel.

This invention will find application in any trunked system that requires users to have the capability to monitor existing conventional groups and their new trunking groups.

While various embodiments of an enhanced talkgroup scan algorithm, according to the present invention, have been described hereinabove, the scope of the invention is defined by the following claims.

What is claimed is:

1. A method for a radio to scan a conventional radio system and a trunked radio system, said conventional radio system emitting an unsquelch code, said trunked system including a control channel and a plurality of trunked channels and emitting subaudible low speed data signals, said trunked system control channel emitting one or more scan markers, each scan marker comprising an outbound signalling word which marks the start of voice activity for the trunked radio system, the method comprising the following steps:
   (a) monitoring the trunked radio system control channel to determine all channel assignments;
   (b) thereafter, monitoring all trunked channels;
   (c) determining when it is time to monitor the conventional radio system;
   (d) when (c) occurs, then saving the identity of the trunked channel currently being received;
   (e) when the proper unsquelch code is detected on said conventional radio system, then monitoring the conventional radio system;
   (f) determining when it is time to return to the trunked radio system;
   (g) when (f) occurs, then returning to the trunked channel saved as in (d).

2. The method of claim 1, wherein said determining step (c) includes the steps of:
   (c1) determining when a predetermined period of time has elapsed since said proper unsquelch code has been detected, or
   (c2) determining when there is no call activity on the trunked radio system.

3. The method of claim 2, wherein said determining step (c2) includes a step of detecting the presence of two consecutive scan markers.

4. The method of claim 3, wherein said determining step (c1) is performed by means of a timer that is implemented in software.

5. The method of claim 1, wherein said determining step (f) includes a step of determining when there is no call activity on the conventional radio system.

6. The method of claim 5, wherein said determining step (f) includes a step of detecting the absence of a proper unsquelch code on the conventional radio system.

7. The method of claim 1 including the further step of:
   (h) determining whether the party that is currently transmitting on the saved trunked channel is the same party that was transmitting on the channel previously, as in step (d).

8. The method of claim 7, wherein said determining step (h) includes a step of determining when the subaudible low speed data on the trunked radio system corresponds to the previously saved call from step (d).

9. The method of claim 8 including the further step of:
   (i) when the determination from step (h) is affirmative, then continuing to receive signals on the saved trunked channel, otherwise returning to step (a), above.

10. A radio arranged for scanning a conventional radio system and a trunked radio system according to a method, said conventional radio system emitting an unsquelch code, said trunked system including a control channel and a plurality of trunked channels and emitting subaudible low speed data signals, said trunked system control channel emitting one or more scan markers, each scan marker comprising an outbound signalling word which marks the start of voice channel activity for the trunked radio system, said method comprising the following steps:
   (a) monitoring the trunked radio system control channel to determine all channel assignments;
   (b) thereafter, monitoring all trunked channels;
   (c) determining when it is time to monitor the conventional radio system;

(d) when (c) occurs, then saving the identity of the trunked channel currently being received;

(e) when the proper unsquelch code is detected on said conventional radio system, then monitoring the conventional radio system;

(f) determining when it is time to return to the trunked radio system;

(g) when (f) occurs, then returning to the trunked channel saved as in (d).

11. The radio of claim 10, wherein said determing step (c) includes the steps of:

(c1) determining when a predetermined period of time has elapsed since said proper unsquelch code has been detected, or (c2) determining when there is no call activity on the trunked radio system.

12. The radio of claim 11, wherein said determining step (c2) includes a step of detecting the presence of two consecutive scan markers.

13. The radio of claim 11, wherein said determining step (c1) is performed by means of a timer that is implemented in software.

14. The radio of claim 10, wherein said determining step (f) includes a step of determining when there is no call activity on the conventional radio system.

15. The radio of claim 14, wherein said determining step (f) includes a step of detecting the absence of a proper unsquelch code on the conventional radio system.

16. The radio of claim 10, said method including the further step of:

(h) determining whether the party that is currently transmitting on the saved trunked channel is the same party that was transmitting on the channel previously, as in step (d).

17. The radio of claim 16, wherein said determining step (h) includes a step of determining when the subaudible low speed data on the trunked radio system corresponds to the previously saved call from step (d).

18. The radio of claim 17, including the further step of:

(i) when the determination from step (h) is affirmative, then continuing to receive signals on the saved trunked channel, otherwise returning to step (a), above.

* * * * *